Dec. 15, 1925.
O. TREIBER
1,565,340
MANUFACTURING SCISSORS AND THE LIKE
Filed May 28, 1925    2 Sheets-Sheet 1
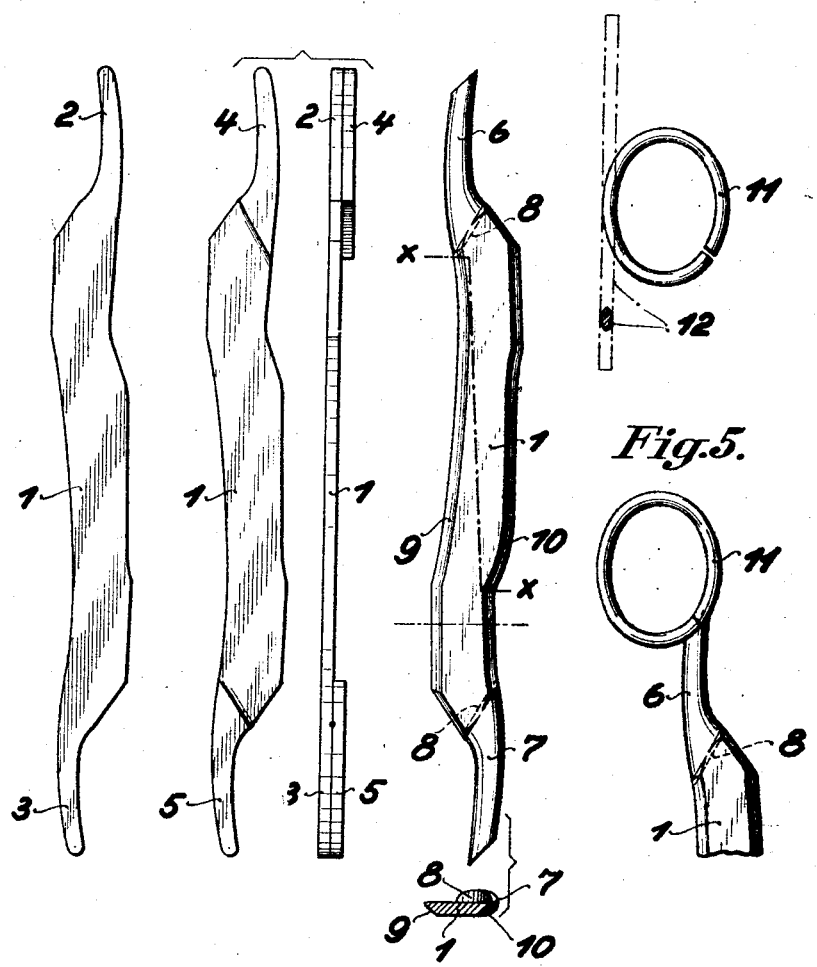
Inventor
Oskar Treiber
by
Attorney

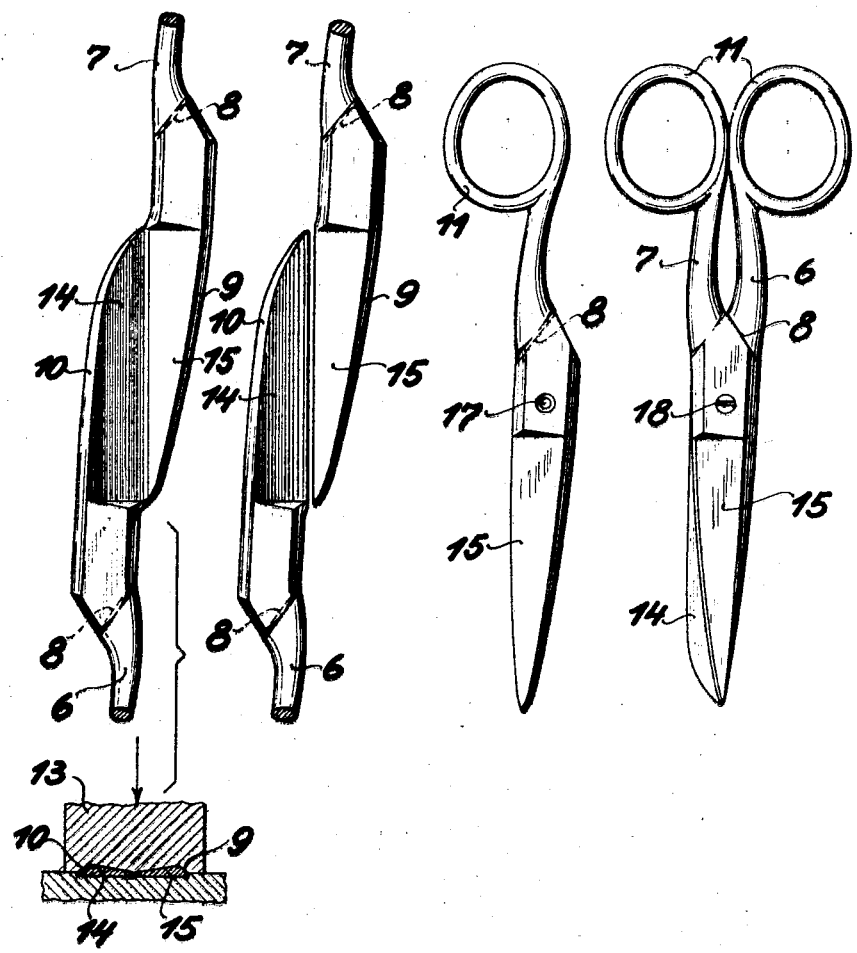

Patented Dec. 15, 1925.

1,565,340

UNITED STATES PATENT OFFICE.

OSKAR TREIBER, OF SOLINGEN, GERMANY.

MANUFACTURING SCISSORS AND THE LIKE.

Application filed May 28, 1925. Serial No. 33,359.

*To all whom it may concern:*

Be it known that I, OSKAR TREIBER, a citizen of Germany, and residing at Solingen, Germany, have invented certain new and useful Improvements in Manufacturing Scissors and the like, on which application for patent has been made in Germany under date of March 21, 1924, and of which the following is a specification.

This invention has reference to improvements in the manufacture of scissors or shears in the cold way, and it is intended to provide means for facilitating the process of manufacture and to effect a considerable saving in material and fuel.

As heretofore practiced, the manufacture of instruments of this kind was carried on by punching the two halves of the scissors, shears or the like from the heated piece of work and by then hardening, grinding and repeatedly polishing and brushing the same. This manner of manufacture, however, was accompanied with great losses of material and it also entailed a considerable expenditure of time and labor.

Now, in accordance with this invention, the manufacture of the halves of scissors in the cold way is effected without any material losses of substance and by making use of a flat, suitably cut piece of steel plate of the required shape and configuration and providing the same at its ends with reinforcements by welding or the like and then compressing the piece of work in different stages of manufacture in direct succession and in such a manner that the two complementary halves obtained from the piece of work are produced without ribs or fins and that they are only connected by a thin web of material easily to be severed, the smooth ready product thereby produced not requiring any further finishing operation after the separation of the two halves. The ears of the scissors, in accordance with my invention, are bent from smoothly drawn figured wire of a configuration corresponding to the desired cross-section of the finished ear and are thereby given the approximate final shape, whereupon they are connected to the beams or legs of the halves by welding or the like and submitted to compression simultaneously therewith, by which means they assume their final configuration and the joints become obliterated as a result of the compression. In view of the novel way of shaping and extending the inter-connected half-sections of the shears or scissors by compression, and preferably by means of specially formed tools, the latter are secured from excessive strain and injury. For the beams or legs and the ears of the half-sections of the scissors no further trimming or finishing operation is necessary after the stretchingly operating compression, while the leaves only require to be once lightly burnished. The expensive grinding on the stone, which is so detrimental to health, and the necessity of burnishing three or four times and subsequent brushing, in accordance with the ordinary course of manufacture as heretofore in use, will therefore be entirely dispensed with. Aside from the doing away with these time-consuming operations and manipulations and the saving of coal resulting therefrom, there is a further saving of material amounting to at least 30% in accordance with the new method of manufacture of my invention.

In the drawings, Figure 1 is a plan view of the blank from which the scissor blades are to be stamped; Fig. 2 depicts the same in plan and edge elevation after the handle beams have been reinforced; Fig. 3 shows the blank after its initial shaping; Fig. 4 depicts the formation of one of the ears; Fig. 5 shows the method of attaching the ears; Fig. 6 shows the blank after the blades have been shaped; Fig. 7 depicts the blades separated; Fig. 8 illustrates one of the scissor blades finished; and Fig. 9 is a view of the scissors complete.

Upon the accompanying drawing the method in accordance with my invention will be described by way of exemplification, showing the method of treatment of a piece of work in the different stages of manufacture and the obtaining of its final shape and configuration. The different stages of manufacture are shown in the drawings in a conventional manner in Figs. 1 to 9 illustrating by way of example the conversion of a blank shown in elevation into its final shape of a finished pair of scissors with a diagrammatic sectional view of the compression members.

The crude blank 1 in accordance with Fig. 1 is punched or cut out in the exact shape appearing from the drawing from a comparatively narrow strip of steel plate. Inasmuch as the projecting ends 2, 3 on opposite sides of the central lines of the blank and corresponding to the beams or legs to be obtained are laterally overlapping each other in the successively cut-out blanks, and in view of the fact that the recesses in the marginal configuration of the blanks are only slight, the waste of material produced in the shaping operation is wholly insignificant. Upon the projecting extremities 2, 3 flat pieces of steel plate 4, 5 of the same shape are mounted with their inclined edges 8 turned towards the interior of the blank and quickly connected to the parts 2, 3 and with sufficient strength and coherence by welding or the like, whereupon the blank thus prepared is submitted to the first compression operation. Thereby the beams 6, 7 are directly given the final shape, as shown in Fig. 3, with the inclined joints at the stopping faces 8, while upon the upper surface of the part 1 and on both sides thereof the bevelled edges 9 and 10 are produced with a simultaneous slight broadening of the part 1 and without the formation of any ribs or fins. The ears 11 of the scissors or shears are produced by bending from a piece of wire 12, as shown in Fig. 4, the smoothly drawn cross-section of which corresponds to the usual cross-section of the finished ears. These portions, after having been bent so as to acquire the approximate shape of the ears 11, are then welded to the correspondingly bevelled front ends of the beams or legs 6 and 7 of the thus prepared piece of work, as shown in Fig. 3, whereby the edges of the joint of the wire ends are also closed simultaneously (Fig. 5). The piece of work is now submitted to a second compression operation which constitutes a most important part of the method of procedure. This compression is particularly intended to effect the shaping of the leaves for the two complementary halves of the scissors or shears. The upper die 13 of the press is substantially wedge-shaped and the edge thereof is placed upon the piece of work longitudinally thereof and under a certain inclination with relation to the longitudinal axis thereof, so that this operating line is in the direction indicated in Fig. 3 by the dash-and-dot line $x-x$. The piece of work in the subsequent compression operation is retained with safety by the sharp edge of the upper die, while the material of the previously shaped piece of work on both sides of the edge is forced outwardly on either side by the strong compression, and the piece of work is finally given the shape shown in Fig. 6, and in this compression operation there is likewise no danger of formation of any fins or ribs. The leaves 14, 15 will then already correspond entirely to the desired finished shape of the two complementary sectional halves of the scissors, one of them presenting the pointed and the other the rounded end. But the other parts of the piece of work obtain the exact final shape by this pressing operation, and in particular the ears 11 are moved into the exact position with relation to their beams or legs 6 and 7 and the welding joints are smoothly compressed. By a corresponding formation of the crude blank 1 the final shape of the leaves obtained by the compression operation last-mentioned may be exactly determined beforehand. After the compression the leaves 14, 15 are still only connected by thin webs of material at the adjacent blades, as appears from the cross-sectional view shown in Fig. 6. Inasmuch as the material under pressure is free to give way and be stretched on both sides and as the piece of work, on the other hand, need not be retained by special means, but is prevented from sliding away, a highly satisfactory and efficient result is obtained by the compression operation described, notwithstanding the transverse displacement of the structure of the material on both sides, and there is no danger of any injurious or excessive strain on the dies and stamps, so that the tools are saved from excessive wear and very long duration and effectiveness are insured thereby. The two sectional halves 14, 15 of the scissors are then separated at the blades in accordance with Fig. 7 and are then submitted to a third and final pressing operation in which any possible existing deformations are eliminated and in which, at the same time, the proper edges are produced on the leaves and trued for the production of the proper cut, and the required teat or socket 17 is obtained for the pivot pin (see Fig. 8). The leaves of the ready sectional halves thus obtained are lightly burnished once in conclusion, whereupon the scissors or shears are aggregated by means of rivets or screws 18. All further subsequent trimming or other operation will therefore be perfectly dispensed with in accordance with the new method of manufacture.

It should of course be understood that the invention is not confined to the specific form and configuration of parts and to the particular arrangement of the various steps of manufacture shown by way of exemplification, inasmuch as these may be modified to suit the particular conditions of manufacture, except as set forth in the claims hereunto appended.

I claim:—

The method of manufacturing scissors, and the like, consisting in providing a longitudinally extending blank with longitudinal end extensions, shaping its sides to provide a substantially straight edge on one side adjacent one end extension and a convex edge on the opposite side adjacent the other end extension, shaping the blank by means of a wedge-like die lengthwise of said blank on a line at an angle to the median line thereof and extending from the straight edge to the convex edge, thereby defining the two blades of the scissors, connected along their cutting edges, one terminating in the straight back edge and the other terminating in the convex back edge whereby when the blades are finished one blade will have a rounded end and the other blade will have a sharpened end, securing ears to the end extensions, severing the defined blades, and pivotally connecting the blades.

In testimony whereof I affix my signature.

OSKAR TREIBER.